United States Patent
Horton

(10) Patent No.: US 8,712,030 B2
(45) Date of Patent: Apr. 29, 2014

(54) SYSTEMS AND METHODS FOR PROCESSING TELEPHONE CALLS

(75) Inventor: Chad D. Horton, Broken Arrow, OK (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3145 days.

(21) Appl. No.: 11/041,420

(22) Filed: Jan. 25, 2005

(65) Prior Publication Data

US 2006/0177038 A1 Aug. 10, 2006

(51) Int. Cl.
*H04M 7/00* (2006.01)

(52) U.S. Cl.
USPC ............... 379/221.13; 379/31; 379/93.18; 379/114.26

(58) Field of Classification Search
USPC ............ 379/221.13, 31, 93.18, 114.26, 219, 379/221.14, 233, 234
See application file for complete search history.

(56) References Cited

U.S. PATENT DOCUMENTS

| | | | | |
|---|---|---|---|---|
| 4,188,508 A | * | 2/1980 | Rogers et al. | 379/189 |
| 5,418,844 A | * | 5/1995 | Morrisey et al. | 379/221.09 |
| 6,061,450 A | * | 5/2000 | Bauer | 379/207.15 |

OTHER PUBLICATIONS

North American Numbering Plan (NANP) Expansion Reference Document, Alliance for Telecommunications Industry Solutions, Industry Numbering Committee Aug. 16, 2002.*
Alliance for Telecommunications Industry Solutions, North American Numbering Plan (NANP) Expansion Reference Document, Aug. 16, 2002, 123 pages.*
Bellaire, James, various pages from http://telecomindiana.com/npax, print date Jan. 10, 2005, 11 pages.
"LincMad Telephone Area Codes & Splits," www.linkmad.com, No. 13, 2000, 4 pages.
Epstein, Norman, "Rationale for the Elimination of NANP Expansion Options by the INC," www.nanc-chair.org/docs/Sep/Sep02-INC-NANP-Expansion-Report.ppt, Sep. 2002, 10 pages.

* cited by examiner

*Primary Examiner* — Duc Nguyen
*Assistant Examiner* — Yosef K Laekemariam

(57) ABSTRACT

A system includes a switching device. The switching device is configured to process a call request as a 12-digit telephone number. The 12-digit telephone number includes a 3-digit area code, a 4-digit location independent code, and a 5-digit location dependent code.

19 Claims, 4 Drawing Sheets

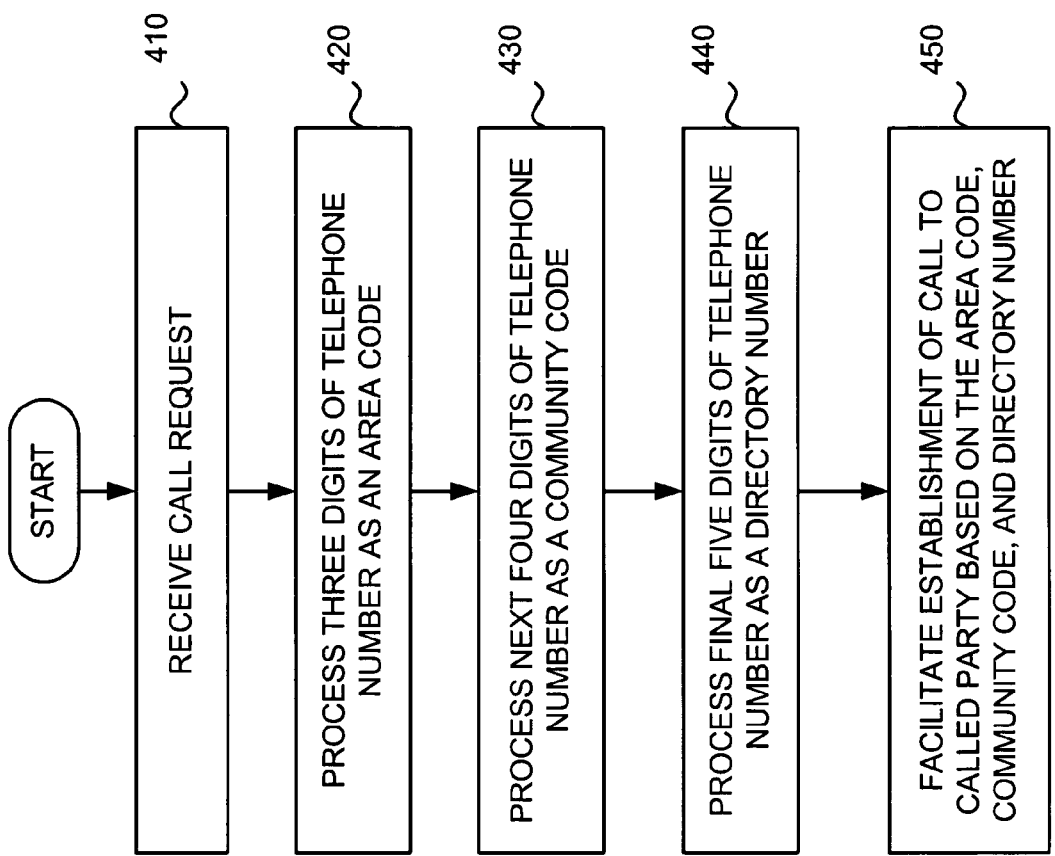

SYSTEMS AND METHODS FOR PROCESSING TELEPHONE CALLS

FIELD OF THE INVENTION

Implementations consistent with the principles of the invention relate generally to communications systems and, more particularly, to systems and methods for processing telephone calls.

BACKGROUND OF THE INVENTION

The current North American Numbering Plan (NANP) is based on a 10-digit telephone number format that includes a three-digit area code (also called a Number Plan Area (NPA)), a three-digit central office prefix code, and a four-digit subscriber line number. The current NANP format can be represented as:

NXX-NXX-XXXX, where N can have a value between 2 and 9, and X can have a value between 0 and 9.

While the current NANP plan has worked well for past several decades, it is slowly approaching its capacity. The reasons for this are many. For example, back in the 1970's or even the 1980's, each family household was typically associated with a single telephone number. Today, it is not uncommon for each family member to have their own telephone number. For example, a typical household may have two or more telephone numbers associated with their house and one or more members of the household may have their own cell phone, each having a unique telephone number. This increased demand for telephone numbers has, among other factors, caused the existing 10-digit NANP to move toward its maximum capacity.

As the life cycle of the North American Numbering Plan (NANP) slowly approaches the need for expansion, several plans such as overlays, realignments, and splits, have been implemented to extend the life of the current 10-digit NANP. Long term planning by the Industry Numbering Committee (INC) has been underway to find the least intrusive and least confusing way to expand the dial plan when needed while sacrificing minimal integrity of the existing plan that everyone has grown to expect and rely on personally as well as economically.

Some proposed NANP expansion formats include increasing the number of digits in the area code (e.g., (N)XXX-XXX-XXXX or N(X)XX-XXX-XXXX), adding a National Destination Code (NDC) (a 1-digit code other than 0 or 1) to the beginning of the current 10-digit NANP (e.g., NDC+NXX-XXX-XXXX), or adding a 2-digit Steering Code (SC) to the beginning of the current 10-digit NANP (e.g., SC (2-digit)+NXX-XXX-XXXX). These proposed NANP expansion formats have a number of well-documented drawbacks, such as transition period problems, dialing problems or conflicts, adverse user impact, or regulatory issues.

SUMMARY OF THE INVENTION

In an implementation consistent with the principles of the invention, a method for processing a call request is provided. The method includes receiving a group of dialed digits. The dialed digits include a 3-digit code, followed by a 4-digit code, followed by a 5-digit code. The method further includes establishing a call using the group of dialed digits.

In another implementation consistent with the principles of the invention, a method for processing a call request is provided. The method includes receiving a group of dialed digits; processing three digits of the dialed digits as an area code; processing four digits of the dialed digits as a location independent code; processing five digits of the dialed digits as a location dependent code; and establishing a call based on the processed three digits, four digits, and five digits.

In still another implementation consistent with the principles of the invention, a method for processing a call request is provided. The method includes receiving a group of dialed digits, where the dialed digits include a format of NXX+XXXX+XXXXX, where N represents a value from 2 to 9 and X represents a value from 0 to 9; and establishing a call using the group of dialed digits.

In still a further implementation consistent with the principles of the invention, a system includes a switching device. The switching device is configured to process a call request as a 12-digit telephone number. The 12-digit telephone number includes a 3-digit area code, a 4-digit location independent code, and a 5-digit location dependent code.

In yet another implementation consistent with the principles of the invention, a method for processing a call request is provided. The method includes receiving a call request, where the call request includes a group of at least 12 dialed digits. The at least 12 dialed digits includes a 3-digit code followed by a 4-digit code. The method further includes processing the call request using the 3-digit code and the 4-digit code.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 4 illustrates an exemplary process for establishing a telephone call in an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention provide a new 12-digit telephone numbering plan. In one implementation, the new 12-digit telephone numbering format includes the conventional 3-digit area code (or NPA), a new 4-digit community code, and a new 5-digit directory number. The new 12-digit telephone numbering format can be represented as follows:

NXX+(DX)XX+XXXXX, where N is a number from 2 to 9, X is a number from 0 to 9, and D is a 0 (or another predetermined number) during a transition period and can be any number from 0 to 9 after the transition period.

Exemplary System

Figure 1:
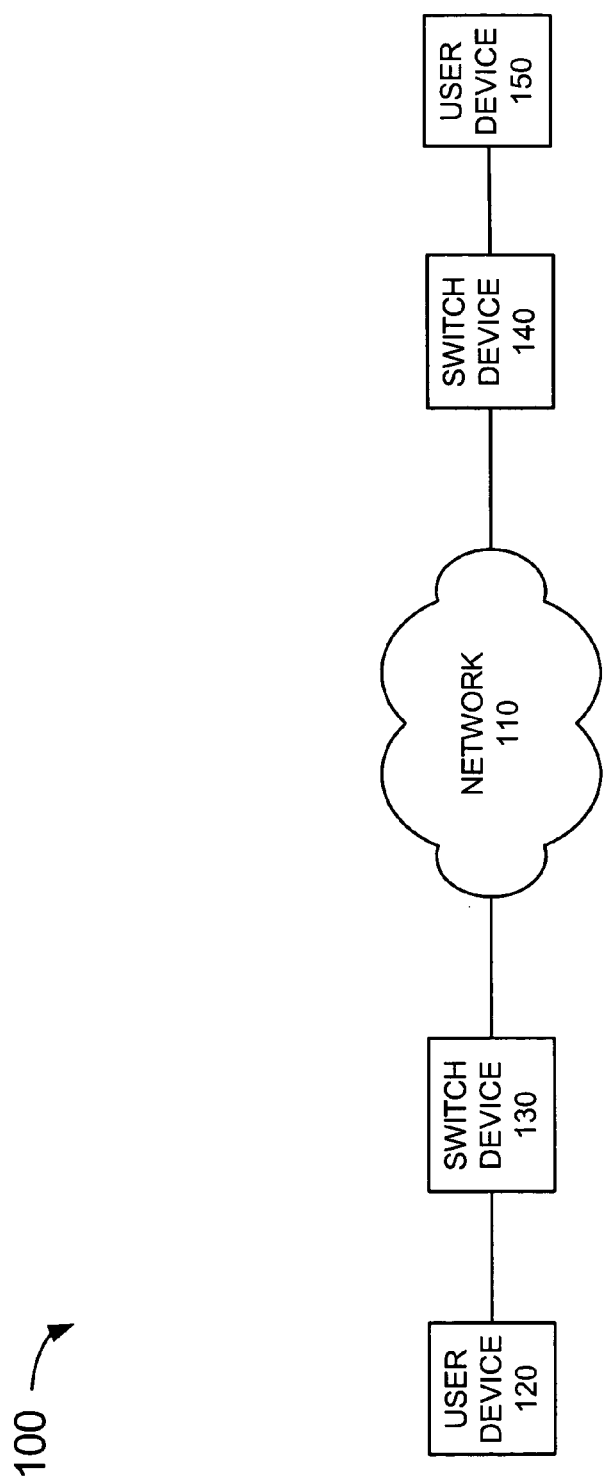
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a network 110, user devices 120 and 150, and switch devices 130 and 140. The number of devices and networks illustrated in FIG. 1 is provided for simplicity. In practice, a typical system could include more or fewer devices and networks than illustrated in FIG. 1.

Network 110 may include one or more networks of any type, including a local area network (LAN), a metropolitan area network (MAN), a wide area network (WAN), a telephone network, such as the Public Switched Telephone Network (PSTN), a Public Land Mobile Network (PLMN), an intranet, the Internet. In one implementation consistent with the principles of the invention, network 110 may include a PSTN and possibly one or more other types of networks.

User devices 120 and 150 may include a device capable of placing or receiving a telephone call. In one implementation, devices 120 and 150 may include a type of telephone system, such as a plain old telephone system (POTS) telephone, a session initiation protocol (SIP) telephone, a wireless telephone device (e.g., a Personal Communications System (PCS) terminal that may combine a cellular radiotelephone with data processing, facsimile, and data communications capabilities, a Personal Digital Assistant (PDA) that can include a radiotelephone, a pager, Internet/intranet access, a Web browser, an organizer, a calendar, and/or a global positioning system (GPS), or the like), etc. In some implementations, devices 120 and 150 may include a type of computer system, such as a mainframe, minicomputer, personal computer, a laptop, or the like. Devices 120 and 150 may connect to switch devices 130 and 140, respectively, via any conventional technique, such as wired, wireless, or optical connections.

Switch devices 130 and 140 may include one or more network devices that aid in establishing telephone calls. In one implementation, switch devices 130 and 140 may include or be part of one or more central offices. While illustrated as being separate from network 110, it will be appreciated that switch devices 130 and 140 may be located within network 110 in other implementations consistent with the principles of the invention. Switch devices 130 and 140 may connect to network 110 via any conventional technique, such as wired, wireless, or optical connections.

Figure 2:
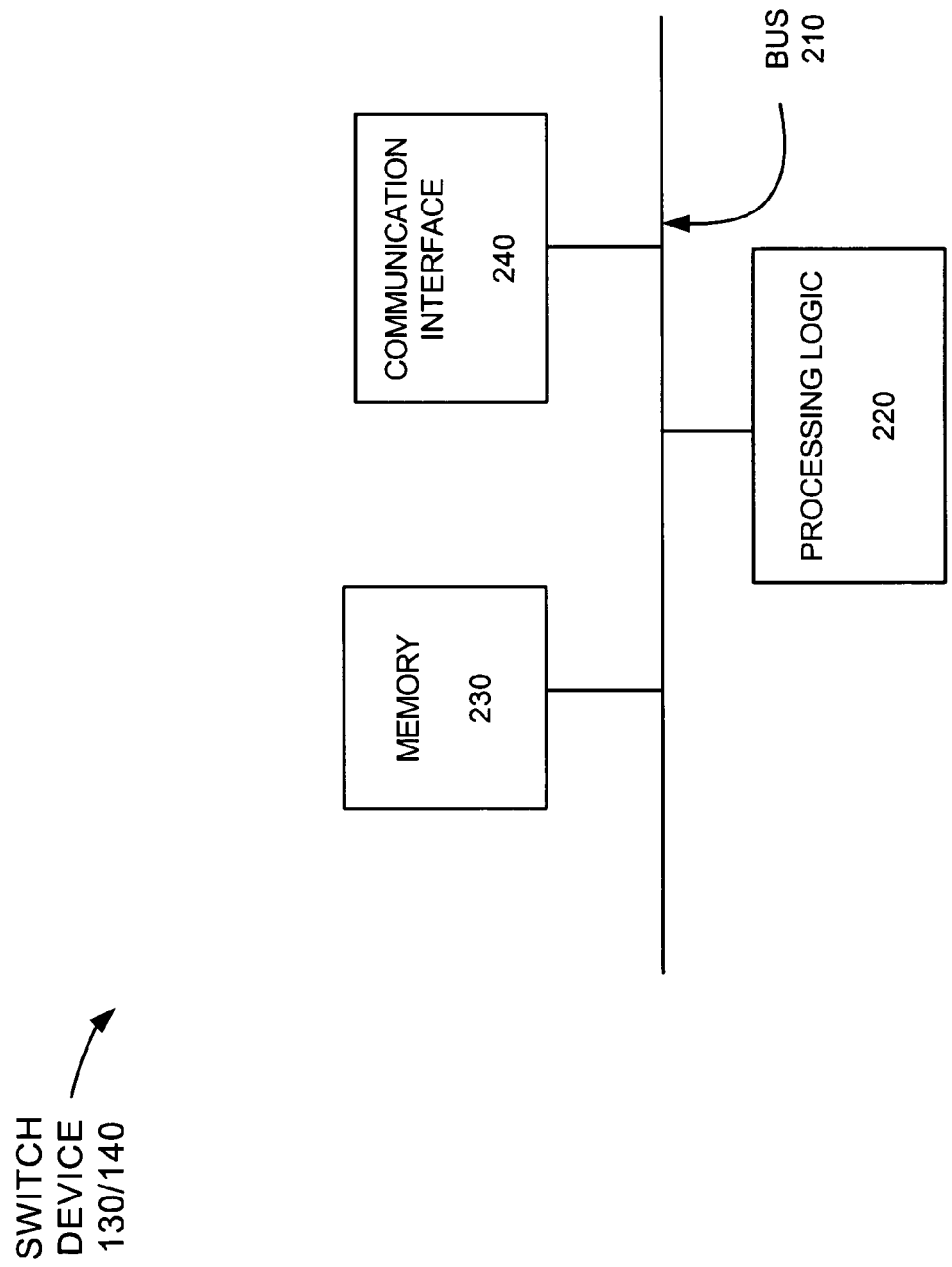
FIG. 2 illustrates an exemplary configuration of a switch device of FIG. 1 in an implementation consistent with the principles of the invention.

FIG. 2 illustrates an exemplary configuration of switch device 130 in an implementation consistent with the principles of the invention. It will be appreciated that switch device 140 may be similarly configured. As illustrated, switch device 130 may include a bus 210, processing logic 220, a memory 230, and a communications interface 240. It will be appreciated that switch device 130 may include other components (not shown) that aid in establishing telephone calls between two or more user devices 120/150.

Bus 210 may permit communication among the components of switch device 130. Processing logic 220 may include any type of conventional processor or microprocessor that interprets and executes instructions. In other implementations, processing logic 220 may be implemented as or include an application specific integrated circuit (ASIC), field programmable gate array (FPGA), or the like.

Memory 230 may include a random access memory (RAM) or another type of dynamic storage device that stores information and instructions for execution by processing logic 220, a read only memory (ROM) and/or another type of static storage device that stores static information and instructions for the processing logic 220, and/or some other type of magnetic or optical recording medium and its corresponding drive. Communication interface 240 may include any transceiver-like mechanism that enables switch device 130 to communicate with other devices and/or systems. For example, communication interface 240 may include mechanisms for communicating with another device or system via a network, such as network 110.

As will be described in detail below, switch device 130, consistent with the principles of the invention, may aid in establishing telephone calls using a new 12-digit telephone numbering plan. Switch device 130 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 240. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary 12-Digit Numbering Format

As set forth above, implementations consistent with the principles of the invention provide 12-digit telephone number dialing. In one implementation, two digits may be added to the beginning of the central office prefix code and the existing 7-digit telephone number may be shifted two digits to the right, resulting in a 12-digit numbering plan. The conventional area code (or NPA code) may not be altered.

Figure 3:
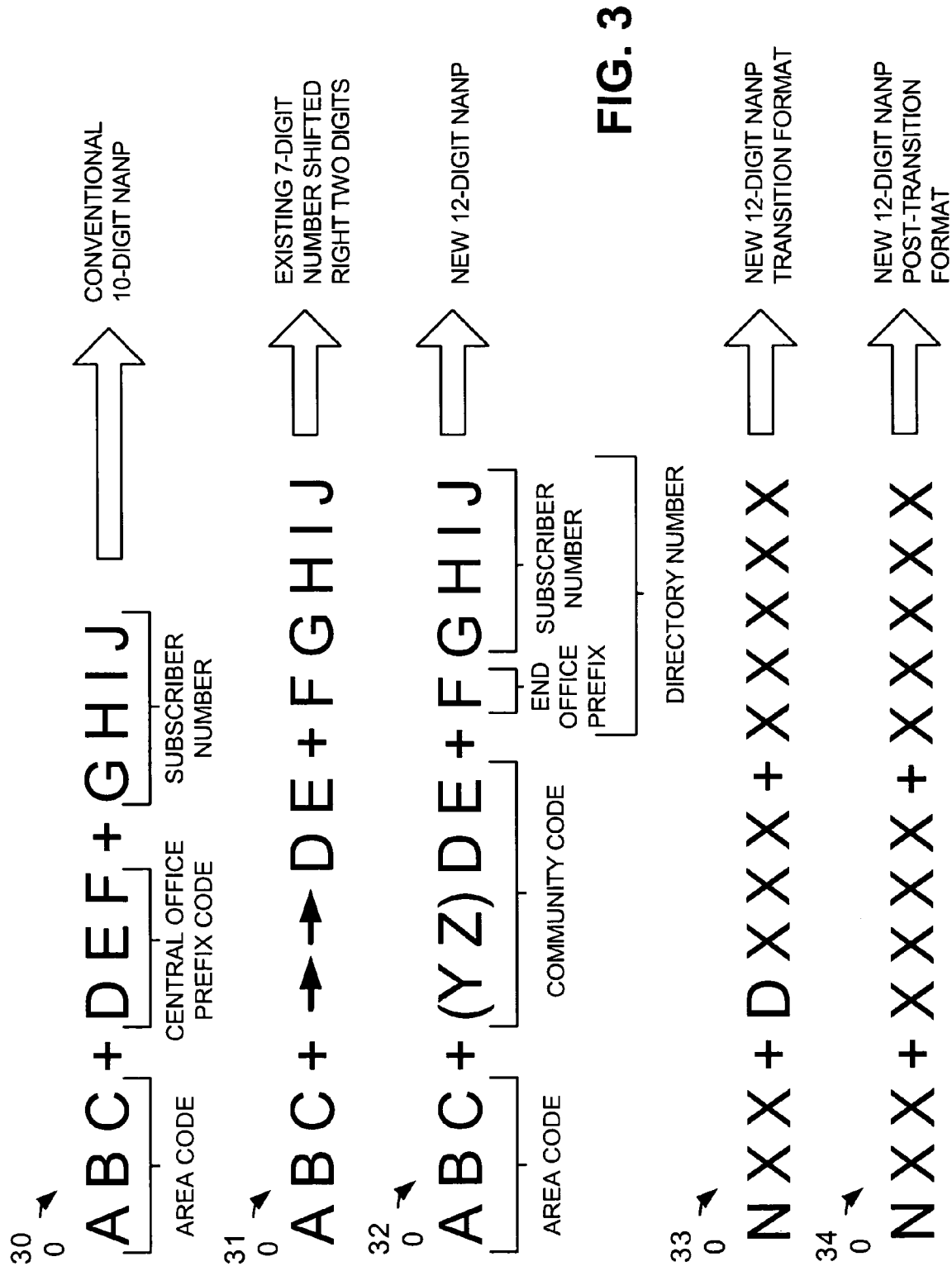
FIG. 3 illustrates the conversion of the existing 10-digit NANP format to a 12-digit format in one implementation consistent with the principles of the invention.

FIG. 3 illustrates the conversion of the existing 10-digit NANP format to a 12-digit format in one implementation consistent with the principles of the invention. As illustrated, the conventional 10-digit NANP format 300 includes a 3-digit area code, a 3-digit central office prefix code, and a 4-digit subscriber number. The 3-digit area code includes digits A, B, and C. The central office prefix code includes digits D, E, and F. And, the subscriber number includes digits G, H, I, and J.

In an implementation consistent with the principles of the invention, the central office prefix code and the subscriber number are shifted two digits to the right and two digits (labeled digits Y and Z) are added to the beginning of the central office prefix code (see 310, FIG. 3). In so doing, the last digit of the central office prefix code (i.e., digit F) is shifted from the central office prefix code to the subscriber number, thereby creating a new 4-digit central office prefix code (referred to hereinafter as a "community code") and a new 5-digit subscriber number (referred to hereinafter as a "directory number"). The shift of digits to the right creates a five-digit directory number using the last digit of the old prefix code which in effect combines 10 old central office prefix codes or exchanges into a single "super" prefix code or exchange (e.g., central office prefix codes 550, 551, 552, . . . , 559 become 55). In this way, a new super prefix code may no longer be associated with a single central office switch, but instead may be associated with multiple switches in a given city or area.

As illustrated in FIG. 3, the new 12-digit NANP format 320 includes a 3-digit area code, a 4-digit community code, and a 5-digit directory number. The 3-digit area code continues to include digits A, B, and C; the community code includes new digits Y and Z, along with digits D and E from the conventional central office prefix code; and the directory number includes the end office prefix F from the conventional central office prefix code, along with digits G, H, I, and J from the conventional subscriber number.

During the period in which subscribers are being transitioned from dialing 7-digit or 10-digit numbers to 12-digit numbers, the 12-digit NANP may have the following format 330:

NXX+(DX)XX+XXXXX where N is a number from 2 to 9, X is a number from 0 to 9, and D (which is the Y digit in FIG. 3) is 0 (or some other predetermined number or character). After the transition period, the restriction on the value of the Y digit (FIG. 3) may be removed, resulting in the following 12-digit NANP format 340:

NXX+(XX)XX+XXXXX where:

NXX=(Area Code—office independent) the conventional three-digit NPA;

(XX)XX=(Community Code—office independent) a four-digit code with two additional digits added to the remaining first two digits of the historic central office prefix code; and XXXXX=(End Office Prefix+Subscriber Number=Directory Number—office dependent) a five-digit line number created by shifting the historic prefix code "F" digit into the subscriber number field.

As an example, assume for explanatory purposes that digits Y and Z (FIG. 3) are each set to "0." Therefore, these values (i.e., "00") would be inserted at the beginning of the historic central office prefix code and the existing 7-digit number would be shifted down two digits. The telephone number "918-555-1212" would thus become "918-0055-51212." In this way, the area code would remain unchanged, thereby preserving the geographic recognition of this code.

Exemplary Processing

FIG. 4 illustrates an exemplary process for establishing a telephone call in an implementation consistent with the principles of the invention. It is assumed for explanatory purposes that switch device 130 acts as both the originating switch device and terminating switch device in a call establishment procedure and performs the functions below. It will be appreciated, however, that the functions described below may be performed by a single switch device, such as switch device 130, another device in system 100, or multiple devices in system 100, which may or may not include switch device 130. For example, some of the functions below may be performed by another switch device, such as switch device 140.

Processing may begin with switch device 130 receiving a telephone call establishment request from a calling party using a user device, such as user device 120 (FIG. 1) (act 410). The request may be received in response to the calling party initiating a call to a desired called party. The calling party may initiate the call by, for example, dialing a telephone number associated with the called party. In an implementation consistent with the principles of the invention, the calling party dials a 12-digit telephone number associated with the called party.

Switch device 130 may receive the dialed digits and process the call request by attempting to establish a connection to the called party. In processing the call request, switch device 130 may process the first 3 digits of the dialed digits as an area code (act 420). It will be appreciated that if the request is for a long distance telephone call, the calling party may dial a "1" prior to dialing the area code. In this situation, switch device 130 may recognize that the first dialed digit (i.e., a "1") is not part of the area code. In one implementation consistent with the principles of the invention, the area code may be formatted as "NXX," where N is a number between 2 and 9 and X is a number between 0 and 9.

Switch device 130 may process the four digits immediately following the area code as the community code (act 430). The community code includes two new digits (Y and Z—FIG. 3) followed by the first two digits of the historic central office prefix code. During a period in which telephone systems are being transitioned to the new 12-digit telephone numbering plan, the community code may be formatted as "DXXX" in one implementation consistent with the principles of the invention, where D is a 0 (or another predetermined number or character) and X is a number from 0 to 9. After the transition period, the community code may be formatted as "XXXX," where X is a number from 0 to 9. The community code is central office independent. Therefore, a central office prefix code may no longer be associated with a single central office switch, but instead, may be associated with multiple switches in a given city or area, similar to area codes.

Switch device 130 may process the next five digits immediately following the community code as the directory number (act 440). As set forth above, the directory number may include the historic central office prefix code "F" digit followed by the historic subscriber number (FIG. 3). The historic central office prefix code "F" digit, also called the "End Office Prefix" hereinafter, may aid in identifying an end switch device (i.e., the switch device with which the user device with which the call is to be established is associated). Thus, the directory number is central office dependent. In one implementation consistent with the principles of the invention, the directory number may be formatted as "XXXXX," where X is a number between 0 and 9.

Switch device 130 may facilitate call establishment to the called party based on the area code, community code, and directory number (act 450).

The following examples illustrate the above processing. Assume that a user at user device 120 dials the following telephone number "9184255-51212." Switch device 130 may readily identify the dialed telephone number as a local call due, for example, to the absence of a "1" as the first received digit. Switch device 130 may process the first three digits of the dialed telephone number (i.e., "918") as the area code. Switch device 130 may process the next four digits of the dialed telephone number (i.e., "4255") as the community code. Switch device 130 may process the last five digits of the dialed number (i.e., "51212") as the directory number. As set forth above, the first digit of the directory number (i.e., "5") may allow the end switch device through which the call is to be established to be identified. Switch device 130 may then facilitate the establishment of a call from user device 120 to a user device associated with telephone number "918-4255-51212."

Assume, as another example, that a user at user device 120 dials the following telephone number "1+412-4255-51212." Switch device 130 may readily identify the dialed telephone number as a long distance call due, for example, to the presence of a "1" as the first received digit. Switch device 130 may process the first three digits of the dialed telephone number (i.e., "412") as the area code. Switch device 130 may process the next four digits of the dialed telephone number (i.e., "4255") as the community code. Switch device 130 may process the last five digits of the dialed number (i.e., "51212") as the directory number. As set forth above, the first digit of the directory number (i.e., "5") may allow the end switch device through which the call is to be established to be identified. Switch device 130 may then facilitate the establishment of a call from user device 120 to a user device associated with telephone number "4124255-51212."

Implementations consistent with the principles of the invention provide more than a 100-fold increase in the quantity of available telephone numbers over the existing 10-digit NANP, by increasing the number of central office prefix codes from 800 to 10,000 and the number of subscriber numbers from 10,000 to 100,000. Moreover, by adding digits to the central office prefix code, implementations consistent with the invention preserve the integrity of special codes, such as "911."

CONCLUSION

Implementations consistent with the principles of the invention provide a new 12-digit telephone numbering plan. In one implementation, the new 12-digit telephone numbering format includes the conventional 3-digit area code (or NPA code), a new 4-digit community code, and a new 5-digit directory number.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on functions performed by a switch device, it will be appreciated that some or all of the functions described above may be implemented by one or more other devices in system 100.

While a series of acts has been described with respect to FIG. 4, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a switch device of a communication system, a group of dialed digits of a call request, the dialed digits including a 3-digit code, followed by a 4-digit code, followed by a 5-digit code; and
   establishing, by the switch device, a call using the group of dialed digits,
      establishing the call including:
         identifying a central office based on a first digit of the 5-digit code.

2. The method of claim 1, where the group of dialed digits includes 12 or 13 digits.

3. The method of claim 1, where the 3-digit code includes a format of NXX, the 4-digit code includes a format of XXXX, and the 5-digit code includes a format of XXXXX, where N represents a value from 2 to 9 and X represents a value from 0 to 9.

4. The method of claim 1, where the 3-digit code includes a format of NXX, the 4-digit code includes a format of DXXX, and the 5-digit code includes a format of XXXXX, where N represents a value from 2 to 9, X represents a value from 0 to 9, and D represents a value of 0.

5. The method of claim 1, where the 3-digit code includes an area code.

6. The method of claim 1, where the 4-digit code is central office independent.

7. The method of claim 6, where the 5-digit code is central office dependent.

8. The method of claim 6, where the 4-digit code is associated with a plurality of switch devices of the communication system.

9. The method of claim 1, where:
   the 3-digit code corresponds to a 3-digit Area Code of a 10-digit telephone number format of a North American Numbering Plan (NANP),
   the 4-digit code includes two digits of a 3-digit Central Office Prefix Code of the 10-digit telephone number format of the NANP, and
   the 5-digit code includes one digit of the 3-digit Central Office Prefix Code, and four digits of the Subscriber Number of the 10-digit telephone number format of the NANP.

10. The method of claim 9, where:
    the two digits of the 3-digit Central Office Prefix Code included in the 4-digit code are the first two digits of the 3-digit Central Office Prefix Code, and
    the one digit of the 3-digit Central Office Prefix Code included in the 5-digit code is the last digit of the 3-digit Central Office Prefix Code.

11. A method comprising:
    receiving, by a switch device of a communication system, a group of dialed digits that includes three digits, followed by four digits, followed by five digits;
    processing, by the switch device, the three digits of the dialed digits as an area code;
    processing, by the switch device, the four digits of the dialed digits as a central office location independent code;
    processing, by the switch device, the five digits of the dialed digits as a central office location dependent code; and
    establishing, by the switch device, a call based on the processed three digits, four digits, and five digits,
       establishing the call including:
          identifying a central office based on a first digit of the five digits.

12. The method of claim 1, where the four digits immediately follow the three digits and the five digits immediately follow the four digits in the group of dialed digits.

13. The method of claim 1, where the three digits include a format of NXX, the four digits include a format of XXXX, and the five digits include a format of XXXXX, where N represents a value from 2 to 9 and X represents a value from 0 to 9.

14. The method of claim 1, where the three digits include a format of NXX, the four digits include a format of DXXX, and the five digits include a format of XXXXX, where N represents a value from 2 to 9, X represents a value from 0 to 9, and D represents a value of 0.

15. A system comprising:
a switching device to:
process a call request as a 12-digit telephone number, the 12-digit telephone number including a 3-digit area code, followed by a 4-digit central office location independent code, followed by a 5-digit central office location dependent code; and
identify a central office based on a first digit of the 5-digit central office location dependent code.

16. The system of claim 15, where the 4-digit code central office location independent code immediately follows the 3-digit area code and the 5-digit code central office dependent code immediately follows the 4-digit central office location independent code in the telephone number.

17. The system of claim 15, where the 3-digit area code includes a format of NXX, the 4-digit central office location independent code includes a format of XXXX, and the 5-digit central office location dependent code includes a format of XXXXX, where N represents a value from 2 to 9 and X represents a value from 0 to 9.

18. The system of claim 15, where the 3-digit area code includes a format of NXX, the 4-digit central office location independent code includes a format of DXXX, and the 5-digit central office location dependent code includes a format of XXXXX, where N represents a value from 2 to 9, X represents a value from 0 to 9, and D represents a value of 0.

19. A method comprising:
receiving a call request at a switch device of a communication system, the call request including a group of at least 12 dialed digits, the at least 12 dialed digits including a 3-digit area code immediately followed by a 4-digit code that includes exactly two digits of a 3-digit Central Office Prefix Code of a 10-digit telephone format of a North American Numbering Plan (NANP); and
processing, by the switch device, the call request using the 3-digit area code and the 4-digit code,
the at least 12 dialed digits further including a final code including at least 5 digits, and
the processing further including:
processing a first digit of the final code to identify a destination switch.

* * * * *